Apr. 17, 1923.
A. G. KUPETZ
1,452,162
COMBINED TYPEWRITING AND COMPUTING MACHINE
Filed July 10, 1918    5 Sheets-Sheet 1
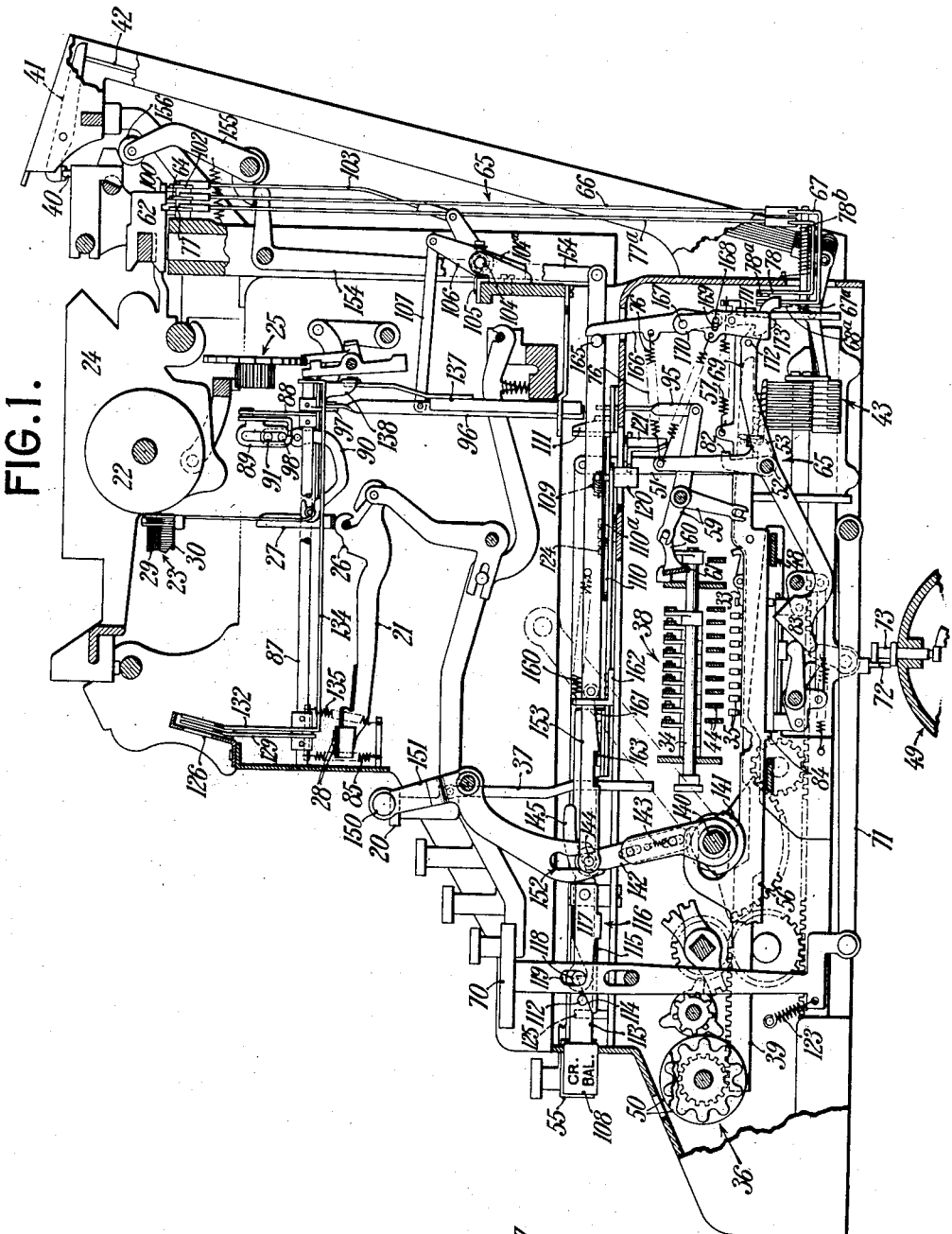
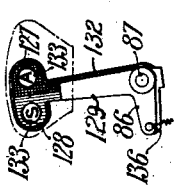
WITNESSES:
John Waldheim
Leopold Pittiger
INVENTOR:
Adolph G. Kupetz
BY B.C. Stickney
ATTORNEY.

Apr. 17, 1923.

A. G. KUPETZ 1,452,162

COMBINED TYPEWRITING AND COMPUTING MACHINE

Filed July 10, 1918

WITNESSES:
John Waldheim
Leopold Bittiger

INVENTOR:
Adolph G. Kupetz
BY
B.C. Stickney
ATTORNEY.

Apr. 17, 1923. 1,452,162
A. G. KUPETZ
COMBINED TYPEWRITING AND COMPUTING MACHINE
Filed July 10, 1918 5 Sheets-Sheet 3

WITNESSES:
John Waldheim
Leopold Bittiger

INVENTOR:
Adolph G Kupetz
BY B.C. Stickney
ATTORNEY.

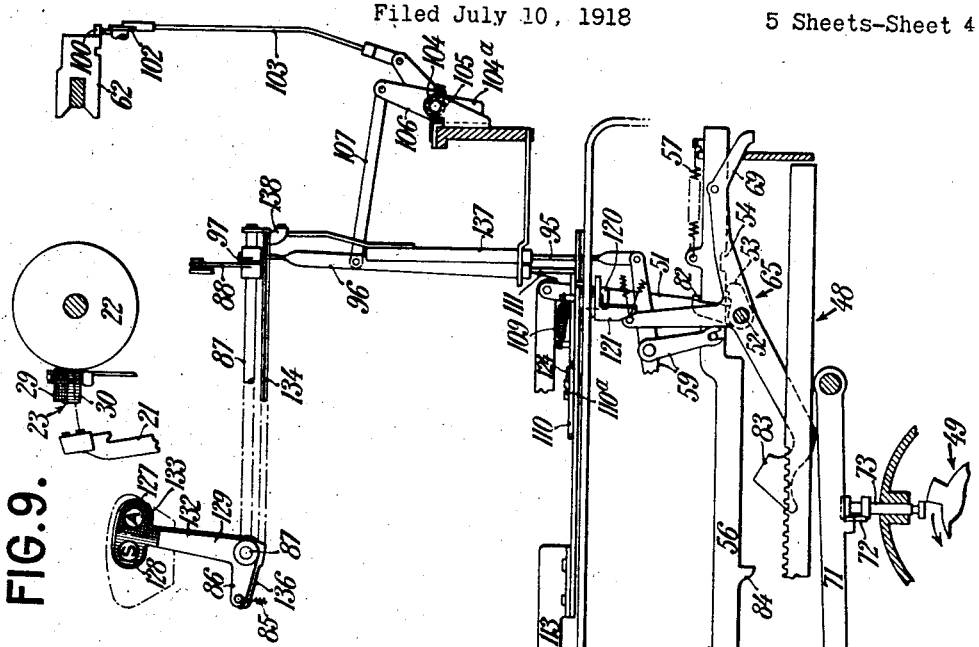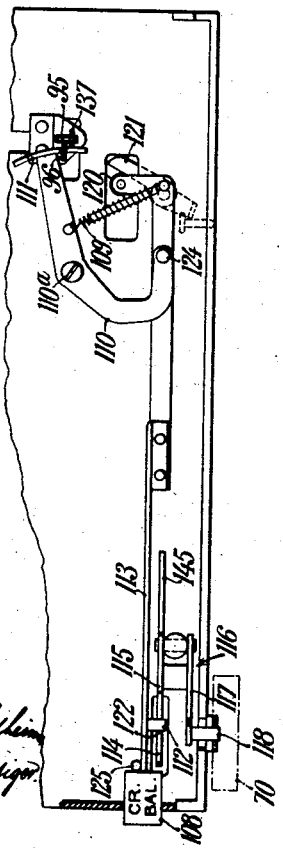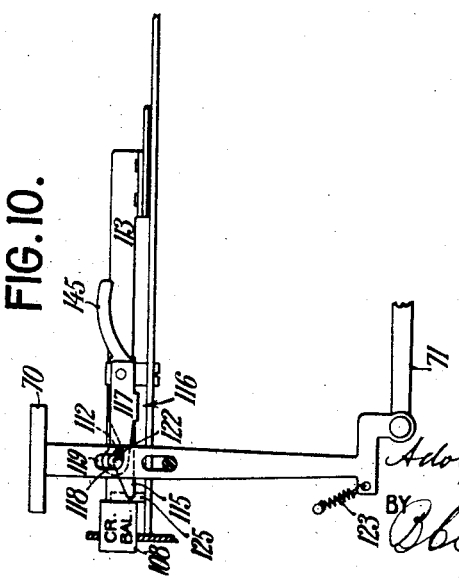

Apr. 17, 1923.
A. G. KUPETZ
1,452,162
COMBINED TYPEWRITING AND COMPUTING MACHINE
Filed July 10, 1918     5 Sheets-Sheet 5
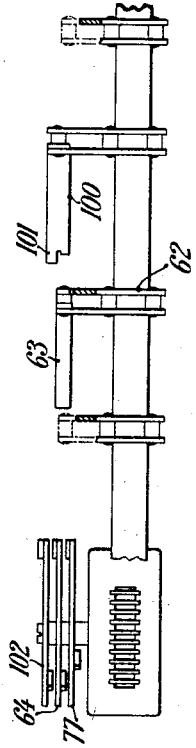
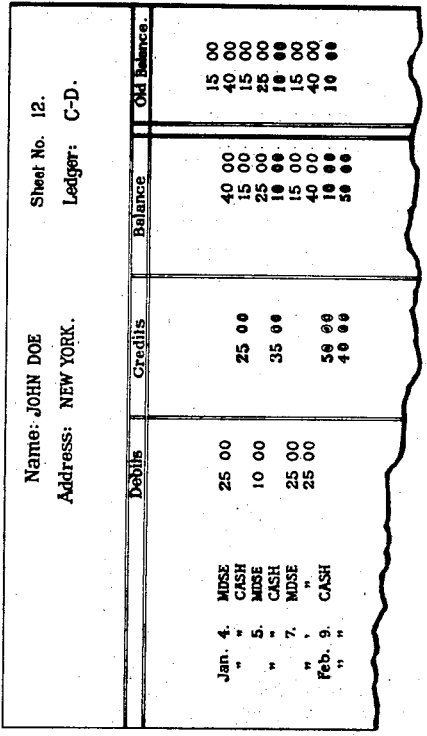
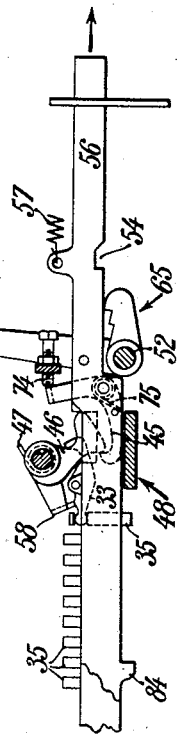
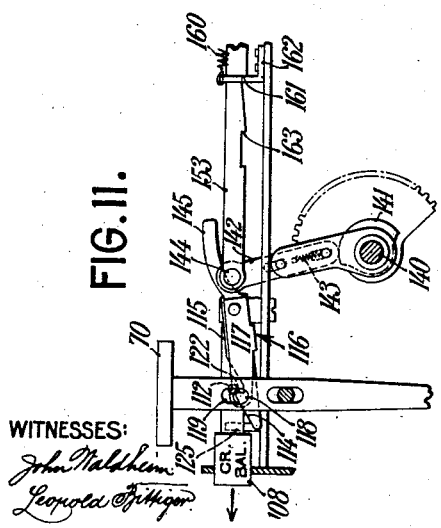
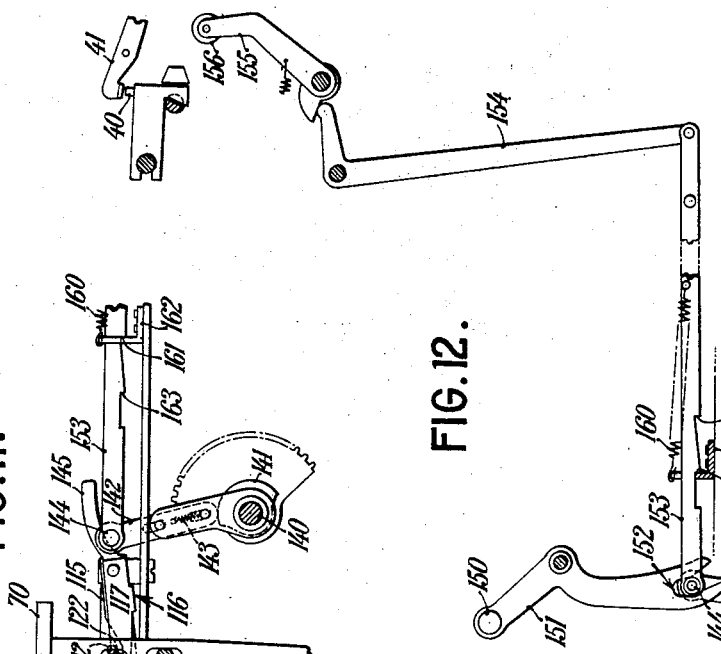
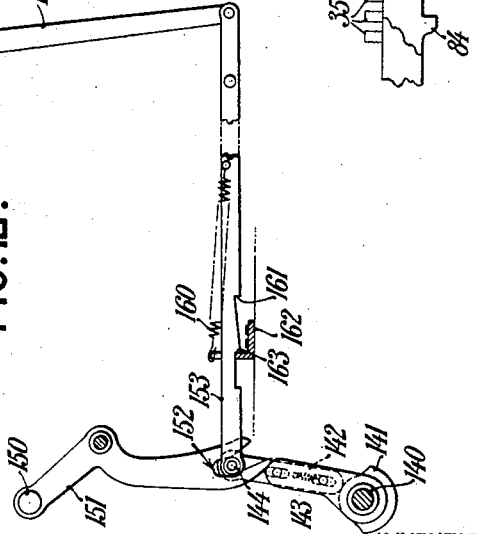
INVENTOR:
Adolph G Kupetz
BY D C Stickney
ATTORNEY.
WITNESSES:
John Waldheim
Leopold Fittiger Patented Apr. 17, 1923.

1,452,162

UNITED STATES PATENT OFFICE.

ADOLPH G. KUPETZ, OF NEW ROCHELLE, NEW YORK, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

Application filed July 10, 1918. Serial No. 244,250.

*To all whom it may concern:*

Be it known that I, ADOLPH G. KUPETZ, a citizen of the United States, residing in New Rochelle, in the county of Westchester and State of New York, have invented certain new and useful Improvements in Combined Typewriting and Computing Machines, of which the following is a specification.

My invention relates to combined typewriting and computing machines, and is illustratively applied to a machine of the Underwood-Hanson type, and is in the form of an improvement on my co-pending application, Serial No. 144,323, filed January 25, 1917 (now Patent No. 1,356,072, dated October 19, 1920).

In said application, a machine is disclosed which is adapted to the keeping of commercial accounts, such as statement and ledger postings, in which numbers are printed in various colors and are additively or subtractively computed on the machine.

One object of my invention is to provide a visual signaling device, which will at a single observation point predict the character of the next computation and the color in which the number will be printed. With this arrangement the operative avoids looking in different places on the machine for the signals and thus confusion is prevented and time-saving attained. To this end, I provide two signaling members, one for indicating the state of the machine and the other for the color of printing, said members being connected with a computing mechanism in such a manner as to co-operatively indicate whether addition or subtraction is to take place, and whether the number computed is to be printed in black or in red. Thus, four permutations are obtained with the use of two signaling members, thereby effecting economy of manufacture.

Another object is to facilitate the manipulation of the machine and obtain simplicity of construction and a low cost of manufacture.

In said application, a special key is depressed when a credit balance is to be posted, connections being provided between said key and a motor-starting key in such a manner that when said special or credit balance key is depressed, it will hold the motor-starting key in depressed position, which requires the use of mechanism between said starting key and motor to prevent the motor from continually driving the machine during said balance-key depression.

I provide connections between said credit balance key and motor-starting key to permit the return to normal position of the motor-starting key, when the credit balance key is depressed, thereby rendering unnecessary mechanism between said key and the motor, said connections being so placed on the machine as to permit the typewriter to be readily removed from and replaced upon the computing machine.

In said application, a non-add key, which disconnects the typewriter from the computing mechanism, is placed above the credit balance key, thereby causing liability of mistake when the operative inadvertently actuates the wrong key because of their proximity.

In the present invention, the typewriter is disconnected from the computing mechanism by a handle conveniently located at the side of the keyboard and connected in such manner with the disconnecting mechanism that the typewriter is easily removed from and replaced on the computing mechanism. With this construction, the handle for disconnecting the typewriter from the computing mechanism and the credit balance key are not in close proximity to each other, thereby avoiding liability of incorrect operation of the machine.

Other features and advantages will hereinafter appear.

In the accompanying drawings,

Figure 1 is a sectional side elevation of a combined typewriting and computing machine, showing my invention applied thereto.

Figure 2 is a detail front view, showing the position of the signaling members when a number is to be computed additively and printed in black, as when posting a debit in the "credit" or "old balance" column of Figure 14.

Figure 3 is a view similar to Figure 2, showing the position of the parts when a number is to be computed additively and printed in red, as when posting a credit in the "balance" column of Figure 14.

Figure 8 is a view similar to Figure 5, showing the position of the parts when the credit balance key is depressed.

Figure 9 is a diagrammatic side view, showing the position of the parts while depressing the credit balance key to set the condition of the machine corresponding with that shown in Figure 8, and for computing a credit in the "balance" column of Figure 14.

Figure 10 is a diagrammatic side view, showing the credit balance key locked in depressed position and the motor-starting key returned to its normal position.

Figure 11 is a view similar to Figure 10, showing the position of the parts when the credit balance key is being released by the general operator.

Figure 12 is a diagrammatic side view, showing the position of the parts when the disconnecting handle is actuated to disconnect the computing mechanism from the control of the typewriter.

Figure 13 is a fractional top plan view of the column-stops on the carriage and adjacent mechanism for controlling the computing mechanism and the bichrome mechanism.

Figure 14 is a sample of a work-sheet produced on the machine, the debit postings (black numbers) being shown in full black lines, and the credit postings (red numbers) being shown by double black lines.

Figure 15 is a detail side view, showing the depression of the "9" pins in a subtraction-setting operation.

Figure 4:
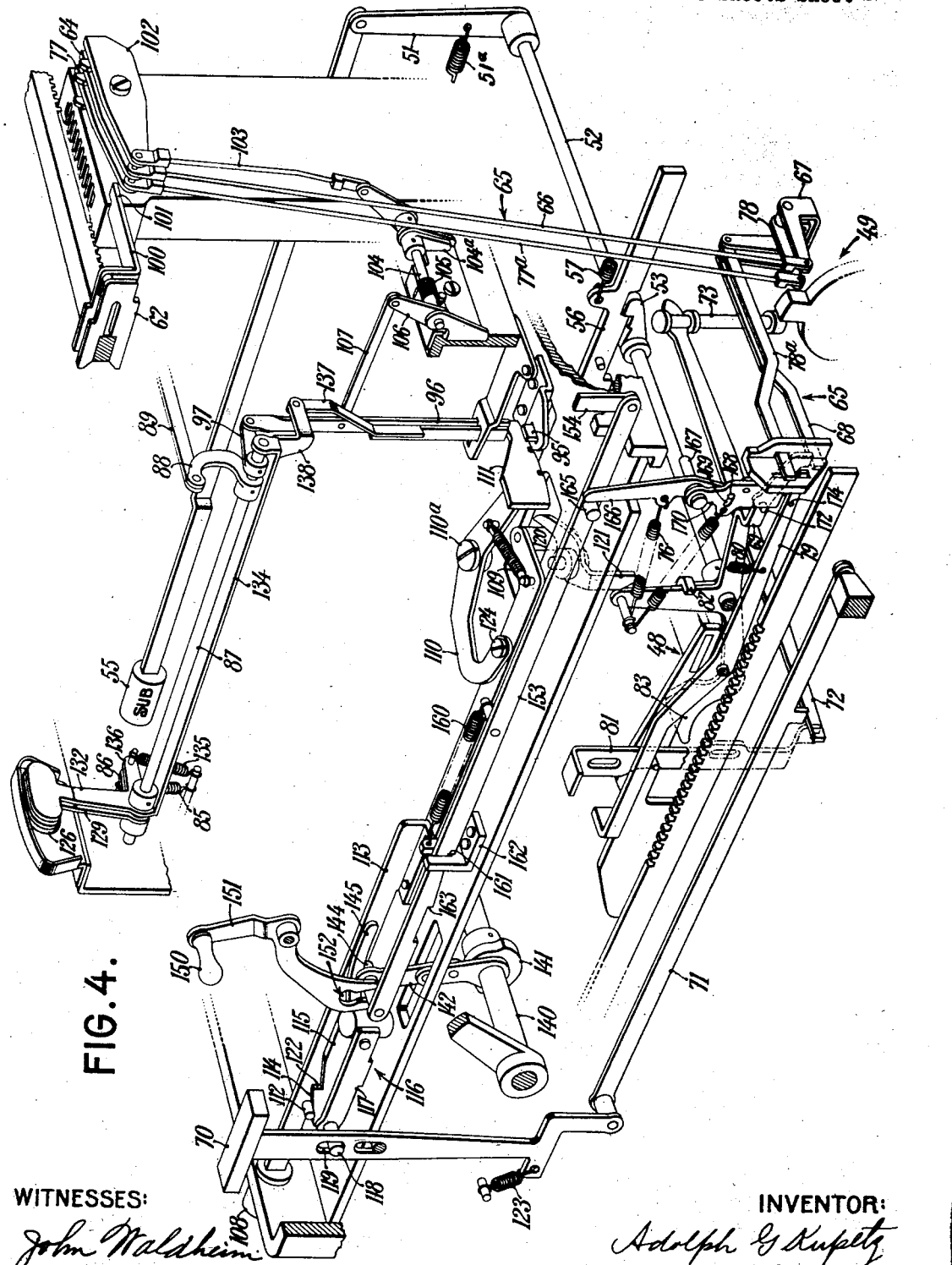
Figure 4 is a skeleton perspective view, showing portions of the machine with my invention applied thereto, parts being omitted for clearness.
Figure 7:
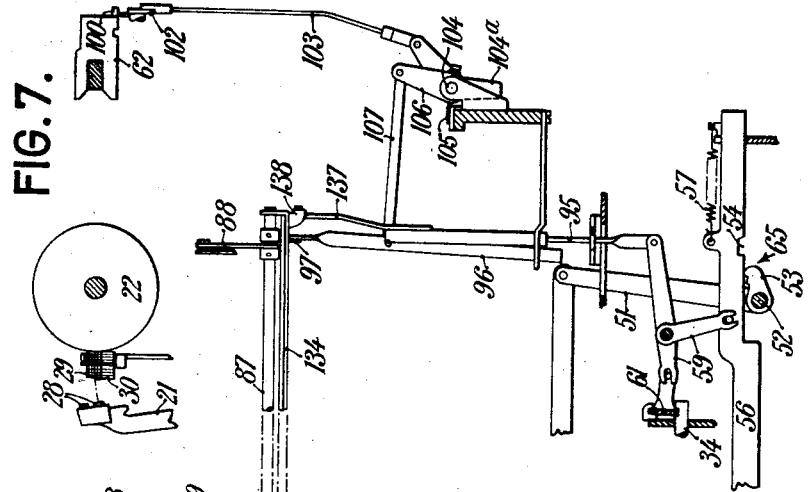
Figure 7 is a view similar to Figure 6, showing the position of the parts when the machine is set for subtraction and to print in black for computing a debit in the "balance" column of Figure 14.
Figure 5:
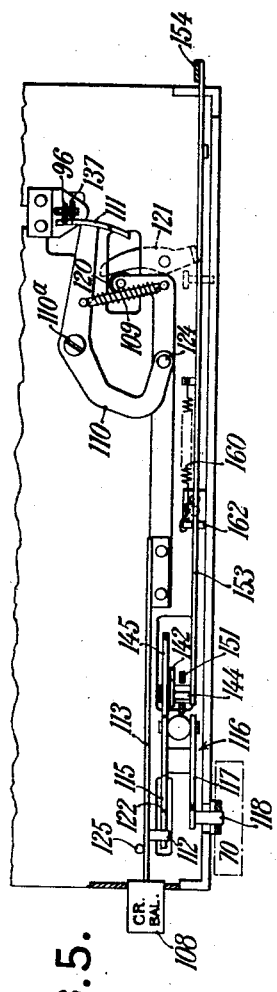
Figure 5 is a fractional top plan view, showing the credit balance key and its connections with the ribbon-setting mechanism and with the motor-starting key, and showing some adjacent parts.

Numeral keys 20, Figure 1, when depressed swing type-bars 21 against a work-sheet on a platen 22 to print through a bichrome ribbon 23. The platen 22 is mounted on a traveling carriage 24 and controlled in its letter-feeding movements by an escapement mechanism indicated in general at 25 and actuated at every key-stroke by a heel 26, on the type-bar 21, actuating a universal bar 27.

The usual Underwood ribbon-vibrating mechanism is mounted on said universal bar 27 to move said ribbon 23 into the path of the types 28 at the depression of a key different distances, to bring a black portion 29 or a red portion 30 of said ribbon to the printing point.

The typewriter is removably mounted above a computing mechanism of the Hanson type and is actively connected therewith, so that the numbers printed by the numeral keys 20 will be set up on a nest of index pins 35, Figures 1 and 15, and subsequently run into a totalizer 36, Figure 1.

For this purpose, each numeral key 20 is provided with a pendant 37, which, when depressed in an adding operation, rocks a shaft 34 to actuate a linkage mechanism 38, to depress an index pin 35 of a digital value directly proportional to the value of the depressed numeral key.

The pins 35, Figure 1, are arranged on denominational bars 39 which are moved into active relation with said linkage mechanism 38 seriatim as the typewriter carriage 24 is fed denominationally, said carriage being provided with a tappet 40 normally in position to actuate a lever jack 41, and depress a link 42, and through the intermediary of a transposition device 43 move the corresponding denominational bar 39 forwardly, so that its pins 35 will lie in juxtaposition with the linkages 44 of said mechanism 38 as more fully illustrated and described in the application of Ogden Minton, Serial No. 797,714, filed October 28, 1913 (now Patent No. 1,280,065, dated September 24, 1918).

After a number has been indexed, a general operator 48, Figure 1, preferably driven by a motor mechanism 49, engages the depressed pins to move forwardly the denominational bars 39 and rotate connected dial wheels 50 of the totalizer 36, to register in said wheels the number computed. The motor 49 and connections for driving the computing mechanism are more fully illustrated and described in the patent issued to John N. Thornton, No. 1,146,371, dated July 13, 1915.

Figure 6:
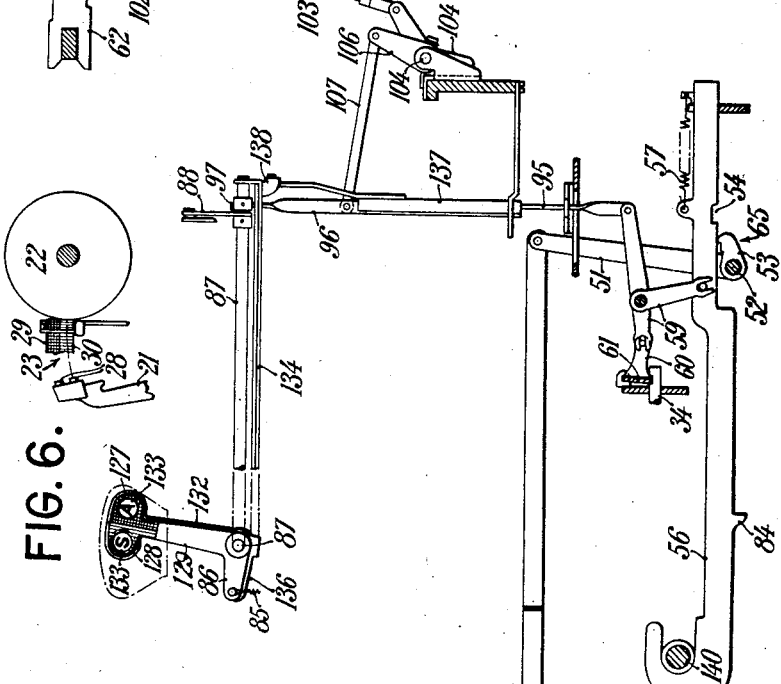
Figure 6 is a diagrammatic view, showing the position of some of the parts when the machine is set for subtraction and to print in red, the condition of the machine corresponding with that shown in Figure 5, and when a computation is performed in the "credit" column of Figure 14.

To set the machine for subtraction, a key 55, Figures 1, 4 and 6, is provided, which, when depressed, rocks an arm 51 against the tension of its spring 51$^a$, and therewith a rock-shaft 52 to move a hook 53 out of a notch 54, formed in a subtraction bar 56. The actuation of said hook 53 releases the subtraction bar 56 to permit its spring 57 to draw said bar rearwardly to actuate a "9" pin-setting member 58, Figure 15, so that the "9" pins of all denominational members 39 will be depressed, and to set the linkage mechanism 38, at the retraction of said bar 56, into condition, so that pins 35 of a complemental value relative to the value of the numeral keys depressed will be set up on the denominational members 39. At the actuation of the computing mechanism, the number thus set up is run into the totalizer 36 subtractively, in a manner illustrated and described in the application of Hans Hanson, Serial No. 626,550, filed May 11, 1911 (now Patent No. 1,278,812, dated September 10, 1918), and in said Minton application.

The connections for setting the linkage mechanism 38 into subtracting condition include a bell-crank 59, Figures 1, 6, 7 and 9, connected to be swung at the retraction of the bar 56 to depress an arm 60 on a shelf 61 universal to all the rock-shafts 34 of the linkage mechanism 38, to move said shelf and shafts forwardly into engagement with linkages of a complemental value relative to the digital value of the rock-shafts to permit accordant index pin depressions.

To depress said "9" pins in a subtraction setting operation, there is fulcrumed on the subtraction bar 56, Figure 15, a bell-crank 45, a hook at the forward end of which engages an arm 46 to draw said arm rearwardly at the retraction of said bar 56, to swing downwardly said member or universal bail 58 against the tension of a spring 47 to rock levers 33 associated with the "9" pins 35 to depress the latter. When said pins are depressed, the bell-crank 45 strikes an abutment 74 to swing the hook of said bell-crank against the tension of a spring 75 to release the arm 46, permitting the spring 47 to return the universal bail 58 from the Figure 15 position to normal position.

The machine herein disclosed is adapted to be automatically set for subtraction when the typewriter carrier 24 enters a subtraction zone. For this purpose, there is mounted on the carriage a column-stop 62, Figure 13, having a lug 63, which, as the carriage enters a subtraction zone, swings a lever 64, and, through the intermediary of connections 65, Figures 1 and 4, releases the subtraction bar 56 and sets the machine to subtraction, in the same manner as when the subtraction key 55 is depressed.

Said connections 65 include a link 66, Figures 1 and 4, which when raised at the actuation of said lever 64 swings a bell-crank 67, against the tension of a spring 67ª, to draw a latch 68 from under one arm of a bell-crank 69 to permit its springs 76 to swing said bell-crank which is loosely mounted on the rock-shaft 52. The upstanding arm of said bell-crank engages an arm 82 fast on the shaft 52, and when swung at its release by the springs 76, rocks the shaft 52 through the arm 82 to withdraw the hook 53 from the notch 54, thereby permitting the retraction of the subtraction bar 56.

It will be noted in passing that the connections 65 are restored to normal position at the forward stroke of the general operator 48, engaging and depressing an arm 83, Figures 1 and 4, of the bell-crank 69. The subtraction bar 56 is restored by the general operator engaging on its forward stroke a projection 84, Figures 6 and 15, on said bar.

After a number is indexed additively or subtractively, the motor 59 for driving the computing mechanism may be started by a motor-starting key 70, Figures 1, 4, 9, 10 and 11, which, when depressed, swings downwardly a lever 71 to rock a transverse lever 72 to raise a latch 73 of the motor mechanism 49 to close the circuit through the motor and actively connect said mechanism to reciprocate the general operator 48, which, in its forward stroke, runs the indexed number into the totalizer. After the general operator has run the number into the totalizer, further actuation thereof returns the subtraction bar 56, the linkage mechanism 38 and the index pins 35 to their normal positions, thereby restoring the machine to normal adding condition.

The machine is also provided with means, whereby the motor 49 may be started automatically by the typewriter carriage after the last digit of a number is indexed. For this purpose, the column-stop 62, mounted on the carriage 24, swings a lever 77, Figures 1, 4 and 13, as the carriage leaves a computing zone, which, through a link 77ª and bell-crank 78, withdraws a latch 78ª against the tension of a spring 78ᵇ, Figure 1, from engagement with a lever 79, Figure 4, to permit its spring 80 to depress a slide 81, which swings said transverse lever 72 to release the motor-latch 73 in the same manner as at the depression of the motor-starting key 70, to actuate the computing mechanism and restore it to adding condition.

When the machine is set for addition, the ribbon mechanism is normally held in position for printing in black by a spring 85, Figures 1 and 4, on an arm 86 fast on a rock-shaft 87 of the ribbon mechanism, which has an arm 88 at the rear end thereof connected by a link with a bichrome shifter 89, whereby the ribbon-vibrating mechanism is connected with the universal bar 27, so as to actuate the ribbon-vibrating lever 90 by the upper pin 91 thereon.

When the machine is set for subtraction, it is desirable to print subtracted numbers in red. For this purpose, the ribbon mechanism is normally connected with the subtraction-setting mechanism, so that when the subtraction bar 56 is retracted, it will thrust upwardly a plunger 95, Figures 1, 4 and 6. and therewith a normally overlying link 96 connected to an arm 97 fast to the rock-shaft 87 of the ribbon mechanism to swing said rock-shaft, so that the bichrome shifter 89 will connect a lower pin 98 of the ribbon-vibrating lever 90 with the universal bar 27, thereby causing the red portion 30 of the ribbon to be moved to effective position at the depression of a numeral key. The column-stops 62 on the rear of the typewriter carriage, Figure 13, are arranged to automatically put the machine into this condition when computation is performed in a "credit" column of the work-sheet, Figure 14.

After computing in the "credit" column, the totalizer will exhibit a number representing a balance. The typewriter carriage is then moved into a "balance" column, Figure 14, so that a lug 100 thereon, Figure 13, will set the machine to subtraction in a similar manner as when the carriage enters a "credit" column. It is, however, undesirable to print the numbers in red when a debit balance is to be computed in the "balance" column. That the numbers may be printed in black, connections are provided to disconnect the ribbon mechanism from the control of the subtraction-setting mechanism. To do this, an extension 101 on the lug 100 swings a lever 102, Figures 1, 4, 5, 7, 9 and 13, as the carriage enters a "balance" column, and, through a link 103, swings a rock-shaft 104, against the tension of a spring 105, and therewith an arm 106 to thrust a link 107, the forward end of which is connected with the link 96, depending from the rock-shaft 87 of the ribbon mechanism. This moves said link 96 out of the path of the plunger 95 which is actuated at the retraction of the subtraction bar 56, so that said plunger 95 when raised will fail to swing the rock-shaft 87 of the ribbon mechanism, thereby permitting the spring 85 to hold said ribbon mechanism in condition for printing black.

The rock-shaft 104 and connections are returned to normal position by the spring 105 when the carriage moves out of a "balance" column, and are limited in their return motion by an arm 104ª engaging the framework of the machine.

If, however, the totalizer indicates a credit balance, it is desirable to compute the number printed in the "balance" column additively and to print said number in red. For this purpose, a credit balance key 108, Figures 1, 4, 5 and 8 to 11, is provided, which, when depressed against the tension of its spring 109, actuates a bell-crank 110, fulcrumed at 110ª, so that a cam 111, formed at one end of said bell-crank, is moved under the link 96 depending from the rock-shaft of the ribbon mechanism, to thrust said link upwardly and swing said rock-shaft, to set the ribbon mechanism in condition for printing red. To restore the machine to adding condition after it has automatically been set for subtraction by the typewriter carriage entering a "balance" column, said credit balance key 108 is connected with the motor-starting key 70 for simultaneously depressing said motor-starting key when the credit balance key is depressed. The connections for this purpose include a pin 112, Figures 1, 4, 5 and 8 to 11, fast on the credit balance key stem 113, which, when depressed, causes said pin to ride on a cam 114 formed at the forward end of an arm 115 of a lever 116, to which is fast an arm 117 to swing with said lever, so that a pin 118 in engagement with a slot 119 in said motor-starting key 70 will depress said key against the tension of its spring 123, thereby tripping the motor-latch 73 to reciprocate the general operator 48, and restore the subtraction bar 56 and linkage mechanism 38 to their normal positions.

To prevent the lug 100 from again setting the machine to subtraction after said reciprocation of the general operator, the end of the credit balance key stem 113 is provided with a roller 120, which, when said key stem is depressed, swings a bell-crank 121 to hold the bell-crank 69 and thereby prevent the connections 65 from releasing the subtraction bar 56, the subtraction bar remaining locked in its normal ineffective position. It will be seen that when the credit balance key 108 is depressed, the machine will be set for addition and to print in red.

To lock the credit balance key 108 in depressed position, Figure 10, the pin 112 thereon is moved behind a hook 122 of the lever 116, which is so formed as to permit its return to its normal position and therewith the motor-starting key 70, said lever and key being returned by the spring 123 of the motor-starting key. It will be understood that the credit balance key 108, when so locked in depressed position, prevents movement of the bell-crank or lever 69 to rock the shaft 52 and release the subtraction bar 56, although of course it does not interfere with the release of the subtraction bar 56 by means of the usual subtraction key 55. The improvement possesses further obvious advantages, as, for example, by depressing the subtraction key 55 after the credit balance key 108 has been locked in depressed position, the machine, while the carriage is in the balance zone, may be set manually for subtraction. It will be noted that the connections between the credit balance key 108 and the motor-starting key 70 are mounted on the computing machine framework, thereby avoiding the removal of the lever 116 and connected parts when the typewriter is removed from the computing mechanism. The credit balance key 108 is guided at its forward end in the machine frame and at its rear end by the bell-crank 110 at its connection 124 with the key stem 113, and is limited in its rearward stroke by a stop 125, Figures 1, 5, 8, 9, 10 and 11, fast on the machine frame.

To predict the color in which numbers will be printed in the next computation, there is provided at the right side of the typewriter frame a single aperture 126, Figures 1 and 4, through which may be seen one of two signals 127, 128, Figures 2 and 3, on a signaling member 129, fixed to the forward end of the rock-shaft 87 of the ribbon mechanism. Said member 127 is normally placed to indicate black at the aperture, Figures 2 and 4, the ribbon mechanism being normally in condition for printing black. When the ribbon mechanism is shifted for printing red, the rock-shaft 87 will swing said signaling member 129, so that the signal 128 thereon, Figure 3, for indicating red will be moved to the aperture.

To predict the character of the next computation, there is provided a signaling member 132 having the signals "A" and "S" thereon to indicate addition and subtraction, respectively.

In order that said computing signals may appear to the same aperture provided for the color signals, each color signal has an aperture 133 formed therein, through which may appear one signal "A" or "S" to predict a type of computation. The apertures in the color signals, although large enough to enable the signals "A" and "S" to be seen therethrough, are smaller than the sight aperture 126, so that whichever signal "A" or "S" is positioned behind aperture 126 will be seen encircled with black or red in accordance with the setting of the ribbon mechanism. The signaling member 132, bearing the computation signals, is mounted directly behind the color signal member 129 at the forward end of a bail 134 journaled on the rock-shaft 87 of the ribbon mechanism. The signal "A" is held in adding position at the aperture 126 by a spring 135 acting on an arm 136 fast on said bail 134. When the machine is set for subtraction by the subtraction key 55 or by the typewriter carriage and lugs 63 or 100, the plunger 95 which actuates the ribbon setting mechanism thrusts upwardly a superposed link 137, Figures 1, 4, 6, 7 and 9, connected to an arm 138 fast to the rear end of said bail 134 to swing said bail against the tension of its spring 135 to move the signal "S" to appear at the aperture 126.

It will be noted that each color signal 127, 128 has an aperture 133 formed therein, which when in effective position is concentric with the aperture 126 on the typewriter framework, and that any of the computing signals "A" or "S" may appear through any of the color signal apertures 133, thereby providing four permutations visible at the aperture 126 by the use of two signal members.

It will also be noted that when the typewriter carriage enters a "balance" column, Figure 14, a black color signal 127 and a subtraction signal "S" will appear at the aperture 126, but when the credit balance key 108 is depressed, the machine will be restored to addition and the computing signal member 132 will be returned by its spring 135 to exhibit "A" at the sight-opening. As hereinbefore described, the depression of the credit balance key also swings the rock shaft 87 of the ribbon mechanism and therewith the color signal member 129, so that the red signal 128 will appear at the aperture 126, as in Figure 3.

To release the depressed credit balance key 108 at the end of a computation, the general operator 48 is geared to a rock shaft 140, Figures 1, 4 and 12, which has a cam 141 fast thereon adapted to raise a link 142 against the tension of a spring 143 at the actuation of said rock shaft, so that a pin 144 at the upper end of said link 142 underlying an arm 145 of the lever 116 which locks said credit balance key will be swung to move the locking hook 122 downwardly against the tension of the spring 123, thereby releasing said lever to return said key and connected parts to their normal positions by the power of its spring 109.

To print numbers in the computing zones without a corresponding computation taking place, means for disconnecting the typewriter from the computing mechanism are provided. For this purpose, a handle 150, Figures 1, 4 and 12, fast on a lever 151 fulcrumed in the side of the machine adjacent the keyboard, has at its lower end a pin-and-slot connection 152 with a thrust link 153, so that when the handle 150 is pulled forwardly, said link will be thrust rearwardly to swing bell cranks 154, 155, Figures 1 and 12, to move a roller 156 from underneath the tappets 40 mounted at the rear of the typewriter carriage, to permit said tappets to drop out of engaging relation with the jacks, thereby rendering the transposition device 43 ineffective, so that the numeral keys will not depress any of the index pins 35. The thrust link 153 is drawn forwardly by a spring 160 and is limited in its forward movement by a latch 161, Figures 1, 4 and 12, co-operating with a bracket 162 fast on the upper or cover plate of the framework of the computing mechanism. When the thrust link 153 is moved rearwardly, another latch 163 is moved into engagement with said bracket 162 to lock the disconnecting mechanism in effective position, as seen in Figure 12.

To release the disconnecting mechanism, the link 142, Figures 1, 4, 11 and 12, which is actuated by the cam 141 at the reciprocation of the general operator, is connected by the pin 144 to the forward end of said thrust link to raise the latch 163 out of engagement with the bracket 162 at the actuation of said general operator, thereby permitting the spring 160 to draw said thrust link forwardly to its normal position. It will be noted that the lower end of the disconnecting lever 151 has the slot so formed as to permit the rise of the forward end of the thrust link when raised by the general operator to release said link, said slot being open at its end to permit easy disconnection between said lever 151 and thrust link 153 when removing the typewriter from the computing mechanism.

Connection is made whereby the disconnecting handle 150 not only silences the denominational control, but also silences the automatic motor-trip-controlling mechanism and the automatic subtraction-setting mechanism whereby, although the carriage 24 in its travel may actuate the levers 64 and 77, the general operator, in the first instance, will not be automatically actuated, and the subtraction-setting mechanism, in the second instance, will not be automatically brought into play. To do this, the thrust link 153 is provided with a pin 165, Figures 1 and 4, which engages a lever 166 pivoted intermediate its ends on a shaft 167 and carrying at its lower end a pin 168 which extends through a slot 169, provided in a latch arm 170 pivotally mounted on the shaft 167.

Thus, when the handle 150 is pulled forwardly, it causes the thrust link 153 to rock the lever 166 against the tension of the upper spring 76, which is connected thereto. This moves the pin 168 which projects into the slot 169, permitting the lower spring 76, which is connected to the latch arm 170, to draw the latch arm forwardly from the Figure 1 position so that a hook latch 171, Figure 1, will catch and hold a stud 172 provided on the arm of the bell crank 69, thereby holding said arm against its normal operation, in which it releases the subtraction bar 56 at an actuation of the subtraction trip lever 64. The latch 171 is also provided with a toe 173 which engages over a stop 174 provided on the lever 79 to lock said lever against actuation.

It will be seen that while the handle 150 is in its effective position, the bell crank will be prevented from rocking under the impulse of the springs 76, and also the lever 79 will be prevented from rocking under the impulse of its spring 80. Under these conditions, when the latches are withdrawn, the subtraction-setting mechanism and the motor-starting mechanism will not be operated, so that the automatic means for controlling the setting for subtraction and the driving of the general operator by the motor are silenced.

It will be noted that the upper spring 76 is considerably stronger than the lower, so that when the handle 150 is returned to its inactive position the upper spring will return the lever 166 and the latch arm 170 to their ineffective positions.

Variations may be resorted to within the scope of the invention, and portions of the improvements may be used without others.

Having thus described my invention, I claim:

1. In a combined typewriting and computing machine, the combination with a printing mechanism, of computing mechanism, multichrome ribbon mechanism, means for computing the printed numbers additively, means for computing the printed numbers subtractively, and means for indicating at a single point on the machine the type of computation and color of printing.

2. In a combined typewriting and computing machine, the combination with a printing mechanism, of computing mechanism, means for printing numbers in black, means for printing numbers in red, means for computing the printed numbers additively, means for computing the printed numbers subtractively, and two signaling members for predicting at a single point on the machine the type of computation and color of printing.

3. In a combined typewriting and computing machine, the combination with a printing mechanism, of computing mechanism, multichrome ribbon mechanism, means for computing the printed numbers additively, means for computing the printed numbers subtractively, signals connected with the computing mechanism for predicting the type of computation, and signals connected to the ribbon mechanism for predicting the color of printing, said signals co-operating at a single point on the machine.

4. In a combined typewriting and computing machine, the combination with a printing mechanism, of computing mechanism for performing a plurality of types of computation, means for printing a computed number in one of a plurality of colors, a plurality of signals on a signal member for indicating said types of computation a plurality of signals on a single member for indicating said colors, and a single point on the machine at which a single signal of each member may appear at a time.

5. In a combined typewriting and a computing machine, the combination with a printing mechanism, of computing mechanism, a multichrome ribbon mechanism, means for computing the printed numbers additively, means for computing the printed numbers subtractively, and means for exhibiting at a single aperture on the machine superposed signals for predicting the type of computation and color of printing.

6. In a combined typewriting and computing machine, the combination with a printing mechanism, of computing mechanism, a multichrome ribbon mechanism, means for computing the printed numbers additively, means for computing the printed numbers subtractively, signals connected with said computing mechanism for predicting the type of computation, signals connected with said ribbon mechanism for predicting the color of printing, and means for rendering said computing signals visible through said color-signals at a single point on the machine.

7. In a combined typewriting and computing machine, the combination with a printing mechanism, of computing mechanism for performing addition and subtraction, multichrome ribbon mechanism, signals connected with said computing mechanism for predicting the type of computation, signals connected with said ribbon mechanism for predicting the color of printing, and a shield having a single aperture through which said signals appear, said color-signals having apertures therein for co-operating with said aperture to enable a computing signal to be seen through a color signal.

8. In a combined typewriting and computing machine, the combination with a printing mechanism, of computing mechanism for performing addition and subtraction, multichrome ribbon mechanism, signals connected with said computing mechanism for predicting the type of computation, signals connected with said ribbon mechanism for predicting the color of printing, and a shield having a single aperture through which said signals appear, said color-signals having a plurality of apertures, any one of which may co-operate with said aperture in the shield to permit a computing signal to appear.

9. In a combined typewriting and computing machine, the combination with a printing mechanism, of computing mechanism for performing addition and subtraction, multichrome ribbon mechanism, signals connected with said computing mechanism for predicting the type of computation, signals connected with said ribbon mechanism for predicting the color of printing; a rock-shaft carrying said color-signals journaled on the typewriter framework and actuable to set the ribbon mechanism, a bail on which said computing signal is fast. swingably supported on said rock-shaft; and a link between said bail and said computing mechanism for actuating said bail from the computing mechanism.

10. In a combined typewriting and computing machine, the combination with a printing mechanism, of computing mechanism, means for printing numbers in black, means for printing numbers in red, means for computing the printed numbers additively, means for computing the printed numbers subtractively, and two signalling members for indicating, at a single point on the machine, whether the machine is set for addition and to print black, or set for addition and to print red, or set for subtraction and to print black, or set for subtraction and to print red.

11. In a combined typewriting and computing machine, the combination with a printing mechanism, of computing mechanism normally set to perform a given type of computation, multichrome ribbon mechanism normally set to print in a given color, signals co-operating at a single point on the machine for indicating said type of computation and said color of printing, means for maintaining said computation and color signals in normal relation with respect to each other, means for changing the normal relation between the signals when the machine is set for a different type of computation or for printing in a different color, and means for automatically restoring the normal relation between said signals at the end of a computation.

12. In a computing machine, the combination with means for setting the machine for substraction, of a motor for driving the computing mechanism, a depressible key for starting said motor, a special key depressible to restore the machine for addition, connections between said special key and said motor-starting key for depressing the motor-starting key at the depression of the special key and releasing said motor-starting key when the depression of said special key is completed, and means for restoring said motor-starting key to normal position, when released.

13. In a computing machine, the combination with means for setting the machine for subtraction, of a motor for driving the computing mechanism, a depressible key for starting said motor, a special key depressible to restore the machine for addition, connections between said special key and said motor-starting key for depressing the motor-starting key at the depression of the special key, said connections serving to lock the special key in depressed position; and means for unlocking said special key at the end of a computation.

14. In a combined typewriting and computing machine, the combination with computing mechanism, of a typewriter mounted on and controlling said computing mechanism, means mounted on the computing mechanism for disconnecting said computing mechanism from the control of the typewriter, and a lever mounted on the typewriter for actuating said means, said lever being so formed as to facilitate the removal of the typewriter from the computing mechanism.

15. In a combined typewriting and computing machine, the combination with computing mechanism, of typewriting mechanism actively connected with said computing mechanism, normally ineffective means for disconnecting the computing mechanism from the typewriting mechanism, means for actuating the computing mechanism, means for locking said disconnecting means in effective position, and means for restoring said disconnecting means to ineffective position at the actuation of the computing mechanism.

16. In a combined typewriting and computing machine, the combination with computing mechanism, of typewriting mechanism actively connected with said computing mechanism, normally ineffective means for disconnecting the computing mechanism from the typewriting mechanism, means for locking said disconnecting means in effective position, a traveling carriage, and means controlled by the carriage for restoring said disconnecting means to ineffective position.

17. In a combined typewriting and computing machine, the combination with computing mechanism, of typewriting mechanism actively connected with said computing mechanism, a traveling carriage, normally ineffective means for disconnecting the computing mechanism from the typewriting mechanism, means for locking said disconnecting means in effective position, means for setting the computing mechanism to perform a type of computation when the carriage enters a computing zone, a normally ineffective key for setting said computing mechanism, for a different type of computation when said carriage is in said zone, means for locking said key in effective position, and a single means for simultaneously restoring said disconnecting means and said key to ineffective position at the end of a computation.

18. In a combined typewriting and computing machine, the combination with printing mechanism including a carriage and multichrome ribbon mechanism, of computing means settable for different kinds of computation, a device for indicating the color to be printed, a device for indicating the kind of computation to be effected, carriage-controlled means to determine the color to be printed and to set said color-indicating device accordingly, and carriage-controlled means to determine the kind of computation to be effected and to set said computation-indicating device accordingly.

19. In a combined typewriting and computing machine, the combination with a carriage and printing mechanism including multichrome ribbon mechanism, of computing means settable for different kinds of computation, a device for indicating the color to be printed a device for indicating the kind of computation to be effected, and carriage-controlled means for actuating said devices including a single member for engagement therewith.

20. In a combined typewriting and computing machine, the combination with a carriage and printing mechanism including multichrome ribbon mechanism, of computing means settable for different kinds of computation, a device for indicating the color to be printed, a device for indicating the kind of computation to be effected, carriage-controlled means for actuating said devices including a single member for engagement therewith, and means whereby said single member is made ineffective for engagement with one of said devices.

21. In a combined typewriting and computing machine, the combination with printing mechanism including settable multichrome mechanism, of computing mechanism settable for different forms of computation, but normally set for a certain one of said forms, a signal connected with said multichrome mechanism to indicate the setting thereof, a signal to indicate the form of computation to be effected, setting means for effecting a change in the state of said computing mechanism, means actuated by said state-setting means for setting both of said signals, and means whereby the signal-setting means may be rendered ineffective with respect to one of said signals.

22. In a combined typewriting and computing machine, the combination with printing mechanism including settable multichrome mechanism, of computing means settable for different forms of computation, but normally set for a certain one of said forms, an indicator comprising a member having a sight-opening therethrough, a signal having different colored-indications thereon corresponding to the colors of said multichrome mechanism, a signal having different indications thereon in accordance with the forms of computation effected by the computing means, said signals being mounted so that their indications may assume positions one behind the other at said sight-opening, and the forward signal having provisions to enable the indications of the rearward signal to be seen therethrough, and means whereby said color signal and said computation signal will be set in accordance with the settings of said multichrome mechanism and said computing means, respectively.

23. In a combined typewriting and computing machine, the combination with printing mechanism including a bichrome mechanism, of computing means normally set for addition, means to set said computing means for subtraction, a signal having two color-indications thereon in accordance with the colors of the bichrome mechanism, a state-indicating signal having addition and subtraction indications thereon, said last-mentioned signal being set normally to indicate addition, and said color signal having a normal setting, mechanism actuated by the subtraction-setting means for changing the setting of each of said signals and of said bichrome mechanism, and means whereby the subtraction-setting means may be made ineffective to change the settings of said color signal and bichrome mechanism.

24. In a combined typewriting and computing machine, the combination with printing mechanism including a bichrome mechanism, of computing means normally set for addition, means to set said computing means for subtraction, a signal having two color-indications thereon in accordance with the colors of the bichrome mechanism, a state-indicating signal having addition and subtraction indications thereon, said last-mentioned signal being set normally to indicate addition, and said color signal having a normal setting, mechanism actuated by the subtraction-setting means for changing the setting of each of said signals and of said bichrome mechanism, means whereby the subtraction-setting means may be made ineffective to change the settings of said color signal and bichrome mechanism, a special key, and means actuated by said special key for restoring said computing means and said state-indicating signal to their normal settings, and for effecting the abnormal setting of said color signal and the corresponding setting of said bichrome mechanism.

25. In a combined typewriting and computing machine, the combination with typewriting mechanism including bichrome mechanism, of computing mechanism normally set for addition, subtraction-setting means, a controlling device for said bichrome mechanism actuated by said subtraction-setting means, a general operator, general-operator-actuated means for resetting said computing mechanism to addition, means including a motor for actuating said general operator, a key, means actuated by said key for shifting said bichrome mechanism, a latch to maintain said key in depressed position, and means actuated by said latch to start said motor.

26. In a combined typewriting and computing machine, the combination with means for typewriting a number in any one of a plurality of colors, of computing mechanism for computing the number so typewritten in any one of a plurality of types of computation, an indicating device comprising color indications and indications of the form of computation effected, whereby any color indication and any computation indication may be exhibited in juxtaposition, and means whereby said indicating device is controlled by the computing mechanism.

27. In a combined typewriting and computing machine, in combination, typewriting mechanism adapted to print in two different colors, computing mechanism settable for addition or subtraction, means including color signals to indicate the color in which typewriting is to be effected, means including addition and subtraction signals to indicate the character of the computation, and means whereby said computing mechanism will cause the proper computation signal to be shown, and will control the color printing and indicating means at times in accordance with the form of computation, and at other times in accordance with the character of the result obtained.

28. In a combined typewriting and computing machine, in combination, typewriting mechanism for printing in two colors, computing mechanism adapted to perform either addition or subtraction, means for controlling said typewriting mechanism and said computing mechanism, so that printing in either color may be effected in connection with computations of either character, color-indicating means having one indication for each color, computation-indicating means having one indication for each form of computation, and means whereby the color indications and computation indications will be grouped together at an observation point for indicating purposes in accordance with the color to be printed and the computation to be effected.

29. In a combined typewriting and computing machine, in combination, typewriting mechanism adapted to print in different colors, computing mechanism adapted to effect different forms of computation, signals adapted, respectively, to indicate different colors in which printing may be effected, signals adapted, respectively, to indicate the forms of computation to be effected, and means to concomitantly position for observation any one of said color signals and any one of said computation signals.

30. In a combined typewriting and computing machine, in combination, typewriting mechanism to print in different colors, mechanism for computing either additively or subtractively, color signals, computation signals, and means for exhibiting superposed color and computation signals for indicating the type of computation and the color of the printing.

31. In a combined typewriting and computing machine, in combination, typewriting mechanism adapted to print in different colors, computing mechanism adapted to effect different forms of computation, color signals having indications thereon corresponding to the colors in which printing may be effected, computation signals having different indications thereon in accordance with the different forms of computation, said signals being so mounted that any color signal and any computation signal may be brought together for observation, and means whereby said color signals and computation signals will be brought together in accordance with the color setting of said typewriting mechanism and the computation setting of said computing mechanism.

32. In a computing machine, in combination, numeral-keys, numeral-key-actuated indexing means, subtraction-setting means for said indexing means, a general operator to compute numbers so indexed, motor mechanism for actuating said general operator, a motor-trip-key, a credit-balance-key to restore said indexing means to adding condition, a pin on said credit-balance-key, a latch member having an inclined cam normally in the path of said pin and a rearwardly-facing shoulder beyond the high point of the cam, means whereby, when said credit-balance-key is depressed, said motor-trip-key will be depressed by said member and then released as the pin rides off the cam, the pin then co-operating with said shoulder to hold the credit-balance-key in depressed position, and a connection between said latch-member and said motor-trip-key, whereby the latter will be actuated and then released.

33. In combination, typewriting mechanism including bichrome mechanism and a signal to indicate the color for which the bichrome mechanism is set, computing mechanism settable either for addition or subtraction including subtraction-setting mechanism, a signal to indicate the state of said computing mechanism, means whereby a setting to subtraction will normally shift said signals to indicate one color and the state to which the machine is set, means whereby, when a balance is to be entered, the subtraction-setting mechanism will be rendered ineffective on said color-signal, a key, and means whereby operation of said key will actuate the color-signal which has been disconnected from the subtraction-setting mechanism and will lock said subtraction-setting mechanism out of action.

34. In a computing machine, in combination, numeral-keys, numeral-key-actuated indexing means and subtraction-setting means for said indexing means, a general operator to compute numbers so indexed, motor mechanism for actuating said general operator, a motor-trip-key, a credit-balance-key to restore said indexing means to adding condition, a lug on said credit-balance-key, a latch member having an inclined cam normally in the path of said lug and a rearwardly-facing shoulder beyond the high point of the cam, means whereby, when said credit-balance-key is depressed, said motor-trip-key will be depressed by said member and then released as the lug rides off the cam, the lug then co-operating with said shoulder to hold the credit-balance-key in depressed position, and means whereby actuation of the motor-trip-key will cause the latch member to be rocked to release the credit-balance-key.

35. In combination, typewriting mechanism including bichrome mechanism and a signal to indicate the color for which the bichrome mechanism is set, computing mechanism settable either for addition or subtraction, motor means for actuating said computing mechanism, a motor-trip-key, a signal to indicate the state of said computing mechanism, means whereby a change in the setting of the computing mechanism will normally cause a shift of said signals to indicate one color and the state to which the machine is set, means whereby, when a debit balance is to be entered, the color signal and bichrome mechanism will be disconnected from the computing mechanism, a key, means whereby operation of said key will actuate the color signal and bichrome mechanism when disconnected from the computing mechanism and will insure an addition setting of the computing mechanism, a pin on said key, a latch member adapted to be cammed out of position by the pin on the key and then to snap back of the pin to hold the key in operated condition, and a connection between said latch member and said motor-trip-key, whereby the movement of the former due to the pin will cause the latter to be actuated and then released.

36. In a combined typewriting and computing machine, in combination, typewriting mechanism including bichrome mechanism, computing mechanism including subtraction-setting mechanism, a movable color signal to display at an observation point the color for which the bichrome mechanism is set, a movable state signal to indicate at said observation point the setting of the computing mechanism for addition or subtraction, means yieldably urging said signals to indicate at said observation point the state of addition and the color in which printing is usually effected for addition, a movable member associated with said subtraction-setting mechanism so as to be moved in one direction when the subtraction-setting mechanism is operated, and in the other direction when the subtraction-setting mechanism is restored to normal condition, two interponents connected with said signals to operate the same and normally lying in the path of said movable member to be actuable thereby, and means whereby the interponent connected with the color signal may be moved out of the path of said movable member.

37. In a combined typewriting and computing machine, in combination, typewriting mechanism including a carriage and bichrome mechanism, computing mechanism including a manually-operable key and subtraction-setting mechanism operable thereby, carriage-controlled means for rendering said subtraction-setting mechanism effective, a movable color signal to display at an observation point the color for which the bichrome mechanism is set, a movable signal to indicate at said observation point the setting of the computing mechanism for addition or subtraction, means yieldingly urging said signals to indicate at said observation point the state of addition and the color in which printing is usually effected for addition, a movable member associated with said subtraction-setting mechanism so as to be moved in one direction when the subtraction-setting mechanism is operated, and in the other direction when the subtraction-setting mechanism is restored to normal condition, two interponents connected with said signals to operate the same and normally lying in the path of said movable member so as to be actuable thereby, and means whereby the interponent connected with the color signal may be moved out of the path of said movable member by said carriage-controlled means when the latter renders the subtraction-setting mechanism effective.

38. In a combined typewriting and computing machine, in combination, typewriting mechanism including a carriage and bichrome mechanism, computing mechanism including a manually-operable key and subtraction-setting mechanism operable thereby, carriage-controlled means for rendering said subtraction-setting mechanism effective, a movable color signal to display at an observation point the color for which the bichrome mechanism is set, a movable signal to indicate at said observation point the setting of the computing mechanism for addition or subtraction, means yieldingly urging said signals to indicate at said observation point the state of addition and the color in which printing is usually effected for addition, a movable member associated with said subtraction-setting mechanism so as to be moved in one direction when the subtraction-setting mechanism is operated, and in the other direction when the subtraction-setting mechanism is restored to normal condition, two interponents connected with said signals to operate the same and normally lying in the path of said movable member to be actuable thereby, means whereby the interponent connected with the color signal may be moved out of the path of said movable member by said carriage-controlled means when the latter renders the subtraction-setting mechanism effective, and manually-operable means to operate the interponent connected with the color signal when it is moved out of the path of said movable member.

39. In a combined typewriting and computing machine, in combination, typewriting mechanism including a carriage and bichrome mechanism, computing mechanism including a manually-operable key and subtraction-setting mechanism operable thereby, carriage-controlled means for rendering said subtraction-setting mechanism effective, a movable color signal to display at an observation point the color for which the bichrome mechanism is set, a movable signal to indicate at said observation point the setting of the computing mechanism for addition or subtraction, means yieldingly urging said signals to indicate at said observation point the state of addition and the color in which printing is usually effected for addition, a movable member associated with said subtraction-setting mechanism so as to be moved in one direction when the subtraction-setting mechanism is operated, and in the other direction when the subtraction-setting mechanism is restored to normal condition, two interponents connected with said signals to operate the same and normally lying in the path of said movable member to be actuable thereby, means whereby the interponent connected with the color signal may be moved out of the path of said movable member by said carriage-controlled means when the latter renders the subtraction-setting mechanism effective, and manually-controlled means to operate the interponent connected with the color signal when it is moved out of the path of said movable member and to reset said machine for addition.

40. In a combined typewriting and computing machine, in combination, typewriting mechanism including a carriage and bichrome mechanism to determine the color of the printing, computing mechanism controlled by the typewriting mechanism and settable to addition or subtraction, a color signal movable to present colors at an observation point in accordance with the colors used in printing, a state signal movable to present at said observation point an indication of the setting of the computing mechanism for addition or subtraction, controlling means whereby a change in state will cause a change in indication of both signals and also of said bichrome mechanism, and carriage-controlled means to render said controlling means ineffective on said color signal and bichrome mechanism.

41. In a combined typewriting and computing machine, in combination, typewriting mechanism including bichrome mechanism to determine the color of the printing, computing mechanism controlled by the typewriting mechanism and settable to addition or subtraction, a color signal pivotally mounted for shifting to present a color at an observation point in accordance with the color used in printing, a state signal pivotally mounted to swing about the same axis as said color signal to positions to present at said observation point an indication of the setting of the computing mechanism for addition or subtraction, means normally holding said signals in position to display in juxtaposition at said observation point an indication of one of said states and an indication of the color ordinarily used in printing in connection with such state, controlling means whereby both of said signals will normally be shifted when a change of state is effected, and means whereby said controlling means may be rendered ineffective on said color signal and bichrome mechanism.

42. In a combined typewriting and computing machine, in combination, typewriting mechanism including bichrome mechanism to determine the color of the printing, computing mechanism controlled by the typewriting mechanism and settable to addition or subtraction, a color signal movable to present a color at an observation point in accordance with the color used in printing and fixed at the front of the machine on a rearwardly-extending shaft, a state signal movable to present at said observation point an indication of the setting for addition or subtraction, a bail to the forward end of which is fixed said state signal, said bail being pivotally mounted on said shaft, arms projecting from said shaft and said bail near the rear end of the shaft, links depending from said arms, and a member movable upwardly or downwardly when the state of the computing mechanism is changed, said member normally underlying said links, so as to lift the same and shift the signals in its upward movement and to permit them to return to normal position when said member is lowered.

43. In a combined typewriting and computing machine, in combination, typewriting mechanism including bichrome mechanism to determine the color of the printing, computing mechanism controlled by the typewriting mechanism and settable to addition or subtraction, a color signal movable to present a color at an observation point in accordance with the color used in printing and fixed at the front of the machine on a rearwardly-extending shaft, a state signal movable to present at said observation point an indication of the setting for addition or subtraction, a bail to the forward end of which is fixed said state signal, said bail being pivotally mounted on said shaft, arms projecting from said shaft and said bail near the rear end of the shaft, links depending from said arms, a member movable upwardly or downwardly when the state of the computing mechanism is changed, said member normally underlying said links, so as to lift the same and shift the signals in its upward movement and to permit them to return to normal position when said member is lowered, and means for shifting the link controlling the color signal out of the path of said member.

44. In a combined typewriting and computing machine, in combination, typewriting mechanism including bichrome mechanism to determine the color of the printing, computing mechanism controlled by the typewriting mechanism and settable to addition or subtraction, a color signal movable to present a color at an observation point in accordance with the color used in printing and fixed at the front of the machine on a rearwardly-extending shaft, a state signal movable to present at said observation point an indication of the setting for addition or subtraction, a bail to the forward end of which is fixed said state signal, said bail being pivotally mounted on said shaft, arms projecting from said shaft and said bail near the rear end of the shaft, links depending from said arms, a member movable upwardly or downwardly when the state of the computing mechanism is changed, said member normally underlying said links, so as to lift the same and shift the signals in its upward movement and to permit them to return to normal position when said member is lowered, and carriage-controlled means for shifting the link controlling the color signal out of the path of said member.

45. In a combined typewriting and computing machine, in combination, typewriting mechanism including bichrome mechanism to determine the color of the printing, computing mechanism controlled by the typewriting mechanism and settable to addition or subtraction, a color signal movable to present a color at an observation point in accordance with the color used in printing and fixed at the front of the machine on a rearwardly-extending shaft, a state signal movable to present at said observation point an indication of the setting for addition or subtraction, a bail to the forward end of which is fixed said state signal, said bail being pivotally mounted on said shaft, arms projecting from said shaft and said bail near the rear end of the shaft, links depending from said arms, a member movable upwardly or downwardly when the state of the computing mechanism is changed, said member normally underlying said links, so as to lift the same and shift the signals in its upward movement and to permit them to return to normal position when said member is lowered, carriage-controlled means for shifting the link controlling the color signal out of the path of said member, and manually-controlled means for lifting the color-controlling link when shifted out of the path of the controlling member.

46. In combination, a typewriter having bichrome mechanism including a signal showing the color printed, computing mechanism, a computer casing on which said typewriter rests, a cover plate for said computing mechanism positioned below the top of the computer casing, a key slidably supported in the front wall of the casing and having a link extending rearwardly therefrom, a bell-crank mounted on a pivot extending upwardly from said cover plate and having an arm pivoted to said link at a point nearly opposite said pivot, so that, upon longitudinal movement of the link, the lateral movement due to its connection with the bell-crank will be slight, the other arm of the bell-crank extending rearwardly, a spring connecting the rearwardly-extending arm to the link to resist the rearward movement of the latter and urge it toward its normal position, a cam carried by the rearwardly-extending arm of said bell-crank, a state signal adjacent said color signal, controlling means for said bichrome mechanism including a link having its lower end normally just to one side of said cam, and means to shift the lower end of the last-mentioned link over said cam, whereby depression of said key will shift the bichrome mechanism.

47. In combination, a typewriter, computing mechanism controlled by said typewriter and including index devices and a general operator for computing numbers indexed in said devices, disconnecting mechanism including a horizontal link, a shaft connected with the general operator so that actuation of one will be accompanied by actuation of the other, an arm mounted on said shaft to turn therewith and having radial movement with respect thereto, a pin pivotally connecting the upper end of said arm with the forward end of said link, a manually-operable lever pivoted on the frame of the typewriter and having an open slot in its lower end to receive said pin and permit shifting thereof without breaking the connection, a cam on the shaft to lift said arm when the general operator is actuated, and a latching device whereby the link will be cammed upwardly in its rearward movement and then dropped into latching position, said link being released from the latching device when said arm is lifted by said cam.

48. In combination, a typewriter having bichrome mechanism including a signal showing the color to be printed, computing mechanism including subtraction-setting mechanism, a computer frame on which the typewriter rests, a cover-plate for said computing mechanism positioned below the top of the computer frame, a key slidably supported in the front wall of the frame and having a link extending rearwardly therefrom, a bell-crank mounted on a pivot extending upwardly from said cover plate and having an arm pivoted to said link at a point nearly opposite to said pivot, so that, upon longitudinal movement of the link, the lateral movement thereof, due to the connection with the bell-crank, will be slight, the other arm of the bell-crank extending rearwardly, controlling means for said bichrome mechanism actuable by the rearwardly-extending arm of the bell-crank, a projection extending downwardly from said link through an opening in the cover plate, and a lever pivoted on the lower face of said plate and engaged by said projection, so that, upon operation of said key, the lever will engage a part of the subtraction-setting mechanism and prevent actuation of the same.

49. In combination, a typewriter including a carriage, numeral-keys and bichrome mechanism to determine the color of the printing, computing mechanism including a frame on which the typewriter rests, numeral-key-controlled indexing means, subtraction-setting mechanism to control said indexing means, a general operator to compute numbers so indexed, disconnect means to render said indexing means ineffective comprising a pin by which it may be operated, a disconnect lever pivoted on the frame of the typewriter and having an open slot to receive said pin when said typewriter is mounted on the frame of the computing mechanism, means whereby said subtraction-setting mechanism normally controls said bichrome mechanism, carriage-controlled means whereby the subtraction-setting mechanism will be operated and the bichrome mechanism will be released from the subtraction-setting mechanism when the carriage enters a balance zone, a credit-balance-key supported on the frame of the computing mechanism, and credit-balance-key-actuated means whereby, when the credit-balance-key is operated after the carriage enters a balance zone, the machine will be reset for addition and the bichrome mechanism shifted.

50. In a combined typewriting and computing machine, in combination, state-setting mechanism, bichrome mechanism normally under the exclusive control of the state-setting mechanism, a manually-operable member, and means to free said bichrome mechanism from the control of said state-setting mechanism and place it under the control of said manually-operable member.

51. In a combined typewriting and computing machine, in combination, carriage state-setting mechanism, bichrome mechanism normally under the exclusive control of the state-setting mechanism, a manually-operable member, and carriage-controlled means to free said bichrome mechanism from the control of said state-setting mechanism and place it under the control of said manually-operable member.

52. In a combined typewriting and computing machine, in combination, state-setting mechanism, bichrome mechanism normally under the exclusive control of the state-setting mechanism, a manually-operable member, means to free said bichrome mechanism from the control of said state-setting mechanism and place it under the control of said manually-operable member, and means actuable by said manually-operable member for controlling said state-setting mechanism.

53. In a combined typewriting and computing machine, in combination, polychrome mechanism, state-setting mechanism, a manually-operable member, and means to place the polychrome mechanism under the control of either the state-setting mechanism or said manually-operable member.

54. In a combined typewriting and computing machine, in combination, carriage polychrome mechanism, state-setting mechanism, a manually-operable member, and carriage-controlled means to place the polychrome mechanism under the control of either the state-setting mechanism or said manually-operable member.

55. In a combined typewriting and computing machine, in combination, polychrome mechanism, state-setting mechanism, a manually-operable member, means to place the polychrome mechanism under the control of either the state-setting mechanism or said manually-operable member, and means actuable by said manually-operable member for controlling said state-setting mechanism.

56. In a combined typewriting and computing machine, in combination, a carriage, computing mechanism, carriage-controlled means for setting said computing mechanism for addition or subtraction, bichrome mechanism normally controlled by said computing mechanism, carriage-controlled means for freeing said bichrome mechanism from said computing mechanism, a manually-operable key for controlling said bichrome mechanism when freed from the control of said computing mechanism, a latch to detain said key in depressed position, and means actuable by said latch for changing the setting of said computing mechanism.

57. In a machine of the class described, in combination, a carriage, a motor to drive the computing mechanism, a credit balance key, bichrome mechanism actuable by the credit balance key when the carriage is in a balance zone, a latch to detain said credit balance key in depressed position, latch-actuated means to start the motor, and motor-actuated means to release the latch.

58. In a combined typewriting and computing machine, the combination with printing mechanism including settable multichrome mechanism, of computing means settable for different forms of computation, and a signaling device comprising a shield having a sight-opening therethrough, a signal having different indications thereon to indicate the colors to be printed for different settings of said multichrome mechanism, and a signal having different indications thereon to indicate the forms of computation to be effected by the computing means, said signals being so mounted that their indications may assume positions in pairs one behind another, at said sight-opening, and being so constructed that the indications so positioned may be seen, one superimposed on the other, through said sight-opening to indicate concurrently the setting of the multichrome mechanism and the setting of the computing means.

ADOLPH G. KUPETZ.

Witnesses:
ELLA A. JOLIDON,
EDITH B. LIBBEY.